May 11, 1926.

F. D. HANSEN ET AL

BUMPER FOR VEHICLES

Filed Dec. 31, 1924

1,583,923

Inventor
Frederick D. Hansen
Herbert W. Tinker
By Rector, Hibben, Davis and Macauley
Attys.

Patented May 11, 1926.

1,583,923

UNITED STATES PATENT OFFICE.

FREDERICK D. HANSEN AND HERBERT W. TINKER, OF MILWAUKEE, WISCONSIN, ASSIGNORS TO FEDERAL PRESSED STEEL COMPANY, OF MILWAUKEE, WISCONSIN, A CORPORATION OF WISCONSIN.

BUMPER FOR VEHICLES.

Application filed December 31, 1924. Serial No. 759,008.

Our invention relates to bumpers for vehicles and has for its general object to provide a bumper which is simple and sturdy in design, cheap to manufacture, efficient and durable in use, and attractive in appearance.

One of the principal objects of our invention is to provide a bumper formed of two parallel channel bars spaced apart by blocks which are arranged between them and to which the supporting arms are secured.

Another important object of our invention is to provide spring means for strengthening the center of the impact bars and improving the action of the bumper and in the present instance, these results are accomplished by providing the spring supporting bar with a central projecting arched portion and placing it in contact with a rubber block mounted centrally on the impact bars.

Other and further objects and advantages of our improved bumper will become apparent from the following description, taken in conjunction with the accompanying drawings.

In the drawings, Figure 1 is a top plan view of a bumper embodying our invention, with one end of the upper impact bar broken away; Fig. 2 is a front elevation of the same; Figs. 3 and 4 are transverse sections taken through the bumper as on the lines 3—3 and 4—4, respectively, of Fig. 2; and Fig. 5 is a transverse section taken on the line 5—5 of Fig. 1.

The impact section of our bumper comprises two parallel impact bars 6, which are alike in construction. Each bar 6 is formed of sheet metal and is channel-shaped in cross section, with the upper and lower horizontal flanges 7 of each bar extending the length of the bar. Positioned between these two impact bars at points removed from their ends are elongated spacing blocks 8 which are positioned between the adjacent flanges 7 of the bars and secured in place by means of bolts 9 which extend through both flanges of both of the bars and apertures through the blocks 8. As shown in Fig. 3, spacing collars or sleeves 10, through which the bolts 9 project, are positioned between the flanges 7 of each impact bar in order to prevent bending of the flanges towards each other when the bolts are fastened securely into place. At each end of the bumper and positioned between the adjacent flanges of the impact bars are spacing blocks 11 which, as illustrated, are hollow or channel-shaped with the inner ends of the horizontal flanges joined by curved vertical flanges 12, it being noted that the ends of the spacing blocks 8 are also correspondingly curved for the purpose of giving the bumper a neat and artistic appearance. While the spacing blocks 8 are solid, they also may be hollow, if desired.

The spacing blocks at their rear sides are provided with oppositely extending vertical projections 13 having rearwardly extending ears or flanges 14, as best shown in Fig. 3. Lying flat against with the rear sides of these projections are the ends 15 of the spring supporting bar or member 16, this bar being formed to provide a forwardly-extending central arched portion 17, intermediate straight portions 18, curved or looped portions 19 and the flat ends 15 which extend towards each other and are parallel to the impact bars and the portions 18. The ends 15 are connected to the blocks 11 by means of screws 20 (Fig. 3) and they are positioned between the ears 14 to prevent rotation of the ends 15 about the screws 20.

At the center of the impact bars, we have provided a plate 22 to the front face of which a trade-mark or design may be applied. This plate 22 has a rearwardly extending portion 23 positioned between the impact bars and the plate 22 is held in place by means of a screw 24 which projects through a plate 25 and at its forward end is screw threaded into an opening in the portion 23 of the plate 22. The plate 25 rests against the inner edges of the inner flanges 7 of the impact bars 6. The portions of the plate 25 above and below these flanges are flanged rearwardly and provided with horizontal parallel grooves. The plate 25 carries a rubber block 27 having parallel horizontal ribs 28 fitting in the grooves. The center of the rubber block 27 is provided with an opening 29 to accommodate the head 30 of the screw 24. As shown in Figs. 1 and 4, the center of the arch 17 of the spring supporting bar 16 contacts with the rear side of the rubber block 27 and the block is retained in position on the plate 25 by the arched portion 17.

From the foregoing description, it will be obvious that the impact section of our bumper is exceptionally strong and rigid throughout its length while at the same time it is artistic in appearance. In front elevation, it gives the impression of being formed of a single integral piece of sheet metal with the front faces of the spacing blocks 8 and 11 pressed slightly inwardly. Bumpers formed of a single piece of sheet metal and having upper and lower flanges and spaced flanged openings have been used heretofore, but the impact bars of such bumpers have been weak at the places between the spaced openings as the vertical connecting portions between the openings have not been provided with horizontal flanges and supporting arms have been connected at these points. In our impact section, there are four continuous horizontal flanges extending the length of the section so that the weak points of such previous impact sections are eliminated.

The central arched portion 17 of the spring supporting bar 16 presses firmly against the rubber block 27, but is not rigidly connected thereto and relative lateral movement between the two is permitted. This cooperation between the arched portion 17 and rubber block 27 helps to eliminate rattle and undue vibration and at the same time strengthens the middle of the impact section. The rubber block also increases the resiliency of the bumper and hence improves its effectiveness. As the arched portion 17 is not connected to the rubber block, but only presses firmly against it, when the impact bar strikes an obstacle, particularly to one side of the middle portion of the impact section, the entire spring supporting bar 16 absorbs the shock or the shock is distributed, so to speak, through the bar 16, whereas if the central arched portion 17 were rigidly connected to the central portion of the impact section the half of the spring supporting bar on the side of the bumper receiving the blow would have to absorb most of the shock and the latter would not be so well distributed. Therefore by forming the spring supporting bar 16 with the looped end portions secured to the impact section and the central arched portion engaging (but not secured to) the rubber block 27 the efficiency of the bumper is very much improved.

We claim:

1. The combination of two channel-shaped impact bars arranged parallel to each other and spaced apart, elongated spacing blocks between the bars and having flat front faces, and spring supporting arms connected to said blocks.

2. In a vehicle bumper, the combination of two channel-shaped impact bars arranged parallel to each other and spaced apart, elongated spacing blocks between the bars at points removed from the ends of the bars and having flat front faces and vertical curved ends, spring supporting arms connected to said blocks, and blocks positioned between and connected to the ends of said impact bars and having their inner ends curved vertically.

3. In a vehicle bumper, the combination of two channel-shaped impact bars arranged parallel to each other and spaced apart, spacing blocks between said bars and having spaced rearwardly extending flanges on their rear sides, spring supporting arms having flat ends arranged parallel to said bars and positioned between said flanges on the spacing blocks, and means for securing said flat ends to said spacing blocks.

4. In a vehicle bumper, the combination of two channel-shaped impact bars arranged parallel to each other and spaced apart, elongated blocks between the bars and having flat front faces and flat rear surfaces, spring supporting arms having flat forward ends engaging against said rear flat surfaces, and screws projecting through said flat forward ends of said arms and screwed into threaded openings in said spacing blocks.

5. In a vehicle bumper, the combination of two channel-shaped impact bars arranged parallel to each other and spaced apart, elongated blocks between said bars at points removed from the ends of said bars and having flat front faces and rear flat surfaces with rearwardly extending parallel flanges, spring supporting arms having flat forward ends engaging against said flat rear surfaces and between said flanges, and screws projecting through openings in said flat ends and screwed into threaded openings in said spacing blocks.

6. In a vehicle bumper, the combination of an impact section, a spring bar section behind the central portion of said impact section, and a rubber block interposed between the central portions of said impact section and said spring bar section.

7. In a vehicle bumper, the combination of a rigid impact section, a spring bar section behind the central portion of the impact section, a plate carried by said impact section and having horizontal flanges, and a rubber block mounted on said plate and between said flanges, and engaged by and held in position on said plate by said spring bar section.

8. In a vehicle bumper, the combination of an impact section, a spring bar section behind the central portion of said impact section and a rubber block carried by the central portion of said impact section and firmly pressed against by said spring bar section.

9. In a vehicle bumper, the combination of an impact section, a spring supporting bar comprising a central forwardly projecting portion, curved end portions and ends connected to said impact section and a rubber block positioned between said central forwardly projecting portion and the central portion of said impact section.

10. In a vehicle bumper, the combination of an impact section, a spring supporting bar comprising a central forwardly projecting portion, curved end portions and ends projecting towards each other and connected to the impact section, and a rubber block carried centrally by said impact section and engaged by said central forwardly projecting portion.

11. In a vehicle bumper, the combination of an impact section comprising two parallel impact bars, a spring supporting bar having a central forwardly extending portion, curved end portions and flat ends projecting towards each other and secured to the impact section, a holder positioned between said impact bars, and a rubber block carried by said holder and retained in position thereon by engagement with said forwardly projecting portion of said spring bar.

12. In a vehicle bumper, the combination of a rigid impact section comprising vertically spaced portions, a spring bar, a holder mounted centrally on said impact section, and a rubber block carried by said holder and engaged by said spring bar.

13. In a vehicle bumper, the combination of an impact section, and a continuous spring supporting bar comprising a central forwardly projecting arched portion, pressing against but unconnected to the center of the impact section, curved end portions and flat ends projecting towards each other and arranged parallel to the impact section and secured thereto.

14. In a vehicle bumper, the combination of an impact section comprising two longitudinal impact portions, one above the other, a supporting section comprising a spring bar, a holder mounted on one of said sections, and a resilient block carried by said holder and engaging the other section.

15. In a vehicle bumper, the combination of an impact section comprising impact portions with a space therebetween, a supporting section comprising a spring bar positioned rearwardly of said space and having its central portion bent forwardly and a resilient block carried centrally by one of said sections and engaged by the other section.

16. In a vehicle bumper, the combination of an impact section comprising two parallel impact portions, one above the other with a space therebetween, a supporting section comprising a spring bar positioned rearwardly of said space and having a forwardly projecting portion, a holder mounted centrally on said impact portion and a resilient block carried by said holder and engaged by the forwardly projecting portion of said spring bar.

17. In a vehicle bumper, the combination of an impact section, a supporting section, a holder on one of said sections, means for securing said holder in place, and a resilient block carried by said holder and having an opening therethrough to accommodate said securing means.

18. In a vehicle bumper, the combination of an impact section comprising two impact portions with a space therebetween, a supporting section, a holder on the rear side of said impact section and bridging said space, a device at the front side of said impact section, a screw for securing said holder to said device, and a resilient block, having an opening therethrough to accommodate one end of said screw and adapted to be engaged by the supporting section.

19. The combination of two channel-shaped impact bars arranged parallel to each other and spaced apart, elongated spacing blocks between the bars and having spaced rearwardly extending flanges, spring supporting arms having their outer ends positioned between said flanges and means for securing the outer ends of the supporting arms in place between said flanges.

20. The combination of two channel-shaped impact bars arranged parallel to each other and spaced apart, spacing blocks between the bars and having rearwardly extending flanges, supporting arms formed of flat spring metal and having portions cooperating with said flanges, and means for securing said portions in cooperating relation with said flanges.

FREDERICK D. HANSEN.
HERBERT W. TINKER.